United States Patent
Payson

(10) Patent No.: US 7,194,661 B1
(45) Date of Patent: Mar. 20, 2007

(54) KEEP ALIVE BUFFERS (KABS)

(75) Inventor: Christopher J. Payson, Bolton, MA (US)

(73) Assignee: Intel Corporation, Santa Clara, CA (US)

( * ) Notice: Subject to any disclaimer, the term of this patent is extended or adjusted under 35 U.S.C. 154(b) by 579 days.

(21) Appl. No.: 10/328,521

(22) Filed: Dec. 23, 2002

(51) Int. Cl.
*G06F 11/00* (2006.01)

(52) U.S. Cl. .......................... 714/43; 370/242; 714/49

(58) Field of Classification Search ................. 714/43; 370/242
See application file for complete search history.

(56) References Cited

U.S. PATENT DOCUMENTS

| | | | | |
|---|---|---|---|---|
| 5,369,634 A | * | 11/1994 | Denissen ................ | 370/253 |
| 5,570,357 A | * | 10/1996 | van Tetering et al. ...... | 714/712 |
| 5,781,529 A | * | 7/1998 | Liang et al. ............... | 370/218 |
| 5,793,976 A | * | 8/1998 | Chen et al. ................ | 709/224 |
| 5,875,177 A | * | 2/1999 | Uriu et al. ................ | 370/244 |
| 6,721,276 B1 | * | 4/2004 | Kher et al. ............... | 370/242 |
| 6,898,752 B2 | * | 5/2005 | Tucker ..................... | 714/752 |
| 2002/0059545 A1 | * | 5/2002 | Nakashima et al. ......... | 714/43 |
| 2003/0117961 A1 | * | 6/2003 | Chuah et al. .............. | 370/242 |
| 2003/0193941 A1 | * | 10/2003 | Bonomi et al. ............ | 370/389 |
| 2006/0203717 A1 | * | 9/2006 | Puppa et al. .............. | 370/216 |

OTHER PUBLICATIONS

Microsoft, Microsoft Computer Dictionary, 2002, Microsoft Press, Fifth Edition, p. 521.*
Google.com, definition of "counter".*

* cited by examiner

*Primary Examiner*—Scott Baderman
*Assistant Examiner*—Paul Contino
(74) *Attorney, Agent, or Firm*—Blakely, Sokoloff, Taylor & Zafman LLP

(57) ABSTRACT

An online system monitoring technique quickly and efficiently identifies failures or other system errors arising during operation of an intermediate network node, such as a network switch. The technique comprises Keep Alive Buffer packets/cells ("KABs") that exercise data and control paths extending from every ingress port to every egress port in the switch. By exercising the data and control paths, the KABs enable testing of, and ensuring against, component failures, missing modules or other types of failure that can be detected as soon as possible, to thereby prevent data flow backup or other performance degradation in the switch.

35 Claims, 12 Drawing Sheets

FastKABEnable Register *1010*

| Control Field | Mode | Word | BitField | Description |
|---|---|---|---|---|
| Reserved | RO | 0 | [31:16] | RAZ |
| EnableKABSP7Q1 | RW | 0 | [15] | SwPort7, Quill 1, LinkPort 0 |
| EnableKABSP7Q0 | RW | 0 | [14] | SwPort7, Quill 0, LinkPort 0 |
| ... | ... | 0 | ... | ... |
| EnableKABSP1Q1 | RW | 0 | [3] | SwPort1, Quill 1, LinkPort 0 |
| EnableKABSP1Q0 | RW | 0 | [2] | SwPort1, Quill 0, LinkPort 0 |
| EnableKABSP0Q1 | RW | 0 | [1] | SwPort0, Quill 1, LinkPort 0 |
| EnableKABSP0Q0 | RW | 0 | [0] | SwPort0, Quill 0, LinkPort 0 |

FastKABTiming Register *1020*

| Control Field | Mode | Word | BitField | Description |
|---|---|---|---|---|
| FastCreditPeriod *1022* | RW | 0 | [31:28] | Check and report arrivals every "CheckPeriod" times through the generate process |
| Reserved | RW | 0 | [27:24] | RWAZ |
| FastGeneratePeriod *1024* | RW | 0 | [23:0] | Non-KAB Cells between auto-generated Fast KABs |

FastKABControl Register *1030*

| Control Field | Mode | Word | BitField | Description |
|---|---|---|---|---|
| Reserved | RO | 0 | [31:14] | RAZ |
| FastCreditLimit *1032* | RW | 0 | [13:8] | 64 credit blocks allocated, total |
| FastVL *1034* | RW | 0 | [7:4] | Internal VL to use |
| Reserved | RW | 0 | [3:2] | RWAZ |
| FastEnaIntKABs *1036* | RW | 0 | [1] | Enable Interrupt on KAB missing |
| FastEnaGenerate *1038* | RW | 0 | [0] | Enable FastKAB auto generation |

AllKABResults Register *1040* *1000*

| Control Field | Mode | Word | BitField | Description |
|---|---|---|---|---|
| Reserved | RW | 0 | [31:28] | Reserved |
| Switch Prt 0, Quill 0 *1042* | RW | 0 | [27:18] | Credits used (limit 1/16 th of total) |
| Reserved | RW | 0 | [17:10] | Reserved |
| Switch Prt 0, Quill 0 *1044* | RW | 0 | [9:0] | Received KAB Count |
| Reserved | RW | 1 | [31:28] | Reserved |
| Switch Prt 0, Quill 1 | RW | 1 | [27:18] | Credits used (limit 1/16 th of total) |
| Reserved | RW | 1 | [17:10] | Reserved |
| Switch Prt 0, Quill 1 | RW | 1 | [9:0] | Received KAB Count |
| Switch Prt 1 | RW | 2,3 | All | [Replicate above fields] |
| Switch Prt 2 | RW | 4,5 | All | [Replicate above fields] |
| ... | ... | ... | ... | ... |
| Switch Prt 7 | RW | 14,15 | All | [Replicate above fields] |

FastKABResults Register *1050*

| Control Field | Mode | Word | BitField | Description |
|---|---|---|---|---|
| Reserved | RO | 0 | [31:16] | RAZ |
| MissKABSP7Q1 | RW1C | 0 | [15] | SwPort7, Quill 1, LinkPort 0 |
| MissKABSP7Q0 | RW1C | 0 | [14] | SwPort7, Quill 0, LinkPort 0 |
| ... | ... | 0 | ... | ... |
| MissKABSP1Q1 | RW1C | 0 | [3] | SwPort1, Quill 1, LinkPort 0 |
| MissKABSP1Q0 | RW1C | 0 | [2] | SwPort1, Quill 0, LinkPort 0 |
| MissKABSP0Q1 | RW1C | 0 | [1] | SwPort0, Quill 1, LinkPort 0 |
| MissKABSP0Q0 | RW1C | 0 | [0] | SwPort0, Quill 0, LinkPort 0 |

Hidden Register *1060*

SlowKABControl Register *1070*

| Control Field | Mode | Word | BitField | Description |
|---|---|---|---|---|
| SlowInject *1072* | RW1T | 0 | [31] | Inject SlowKAB to Dest below |
| Reserved | RO | 0 | [30:28] | RAZ |
| SlowCreditFree *1073* | RO | 0 | [27:16] | Credits allocated but not yet used |
| Reserved | RW | 0 | [15:14] | RWAZ |
| SlowCreditLimit *1074* | RW | 0 | [13:8] | 64 credit blocks allocated, total |
| SlowVL *1075* | RW | 0 | [7:4] | Dest (Internal) VL |
| SlowDestSwPort *1076* | RW | 0 | [3:1] | Dest Switch Port Number |
| SlowDestQuill *1078* | RW | 0 | [0] | Dest Quill Number |

FIG. 10

KEEP ALIVE BUFFERS (KABS)

FIELD OF THE INVENTION

The present invention relates to communications networks and, more specifically, to a technique for efficiently detecting failures or other system errors in an intermediate network node of a communications network.

BACKGROUND OF THE INVENTION

Communication in a computer network involves the exchange of data between two or more entities interconnected by communication links. These entities are typically software programs executing on computer platforms, such as end nodes and intermediate network nodes. Examples of an intermediate network node may be a router or switch that interconnects the communication links to enable transmission of data between the end nodes, such as servers having processor, memory and input/output (I/O) storage resources.

Communication software executing on the end nodes correlates and manages data communication with other end nodes. The nodes typically communicate by exchanging discrete frames or packets of data according to predefined protocols. In this context, a protocol consists of a set of rules defining how the nodes interact with each other. In addition, network software executing on the intermediate nodes allows expansion of communication to other end nodes. Collectively, these hardware and software components comprise a communications network and their interconnections are defined by an under-lying architecture.

The InfiniBand Architecture (IBA) is an I/O specification that defines a point-to-point, "switched fabric" technology used to, among other things, increase the aggregate data rate between processor and storage resources of a server. The IBA is described in the *InfiniBand™ Architecture Specification Volume 1, Release 1.0.a*, by InfiniBand Trade Association, Jun. 19, 2001, which specification is hereby incorporated by reference as though fully set forth herein. Broadly stated, the switched fabric technology may be embodied in a network switch configured to receive data traffic (IBA packets) from one or more input ports and forward that traffic over one or more output ports to an IBA communications network. A switch fabric of the network switch may interconnect a plurality of modules having input (ingress) and output (egress) ports that provide, e.g., Fibre Channel or Gigabit Ethernet link connections to the network.

Some network switches include fault tolerant features that enable single error (fault) detection and correction. These switches are typically fully redundant such that there is no single point of failure. A failure is defined as an unpredictable event that arises in the switch. The architecture of the switch may account for congestion that leads to dropping of packets; this is not typically considered a failure. Higher-level protocols executing on the switch in various parts of the network may take a long time to respond to failures detected by those protocols. This latency may result in increased traffic loss and congestion, along with other problems. The present invention is directed, in part, to detecting failures or errors as soon as possible in the switch.

In a fully redundant network switch system, any single fault only disables the module on which the fault occurs. Other modules in the switch may experience performance, but not functional, loss. Although the redundant network switch is single-fault tolerant, multiple simultaneous faults can still "cripple" the switch. To maintain a fault tolerant system, any single fault must be detected and repaired as soon as possible to avoid a multiple fault situation. The present invention is further directed to providing an assist that detects when there may be an actual error (fault) in the network switch so that the fault can be corrected to thereby reduce the possibility of multiple faults occurring at substantially the same time.

SUMMARY OF THE INVENTION

The present invention overcomes the disadvantages of the prior art by providing an online system monitoring technique that quickly and efficiently identifies failures or other system errors arising during operation of an intermediate network node, such as a network switch. The technique comprises Keep Alive Buffer packets/cells ("KABs") that exercise data and control paths extending from every ingress port to every egress port in the switch. By exercising the data and control paths, the KABs enable testing of, and ensuring against, component failures, missing modules or other types of failure that can be detected as soon as possible, to thereby prevent data flow backup or other performance degradation in the switch.

According to the invention, the KABs are manifested in two forms: FastKABs and SlowKABs. A FastKAB is a minimum size packet that is generated by a KAB generator on an ingress path of the switch. FastKABs are preferably generated and "launched" automatically by switch hardware such that they are constantly flowing throughout the switch to provide a periodic check of the switch. SlowKABs, on the other hand, are initiated by software (executed by a processor) to enable further diagnosis of a potential failure in the switch. For example, a SlowKAB may be generated in response to a FastKAB failure, insertion of a new module within the switch, a non-responsive module to processor access or any other event that requires generation of such a processor-initiated diagnostic tool. A SlowKAB can be injected into the switch by software at any time.

Broadly stated, each KAB is injected into and traverses the data path between the ingress and egress ports at line rate, similar to a packet that is received at, switched and forwarded from the switch. The KAB is injected into the data path at a low frequency that essentially "hides" the KAB behind the overhead of a link protocol and does not generally interfere with normal operating traffic. When traversing the data path, the KAB checks the ingress buffering and queuing system, the request and grant control paths, the serial links and transceivers, the switch fabric operation, the egress buffering and queuing system, and the scheduling functions of the switch.

In the illustrative embodiment, the mere existence (reception) of the KABs, i.e., whether they traversed the data path of the switch, is recorded at the egress port. If KABs are not periodically received at an egress port, an indication is provided that there may be a malfunction in the switch. The malfunction indication may not be an actual error (fault), but rather could be congestion in the switch. Non-reception of KABs as a result of congestion may indicate that there is excessive traffic destined to the port that is missing the KABs. In this context, the invention provides a low-level diagnostic that monitors the internal performance of the switch.

The KABs may also cooperate with any fault tolerant elements of the switch to enable failover operations that allow the switch to continue functioning in a manner that is transparent to high-level application software endpoints. To that end, the KABs may function as an assist to the fault tolerant elements to detect when there may be an actual error (fault). In addition, the KABs may be used in the initial design and debug of the switch, as well as in manufacturing test, diagnostics and performance measurement. Use of the KABs obviates the need for external network equipment attached to the physical switch platform to test the internal components and functions of the switch.

BRIEF DESCRIPTION OF THE DRAWINGS

The above and further advantages of the invention may be better understood by referring to the following description in conjunction with the accompanying drawings in which like reference numerals indicate identical or functionally similar elements:

FIG. 10 is a schematic block diagram illustrating various KAB Control and Status Block registers in accordance with the present invention;

DETAILED DESCRIPTION OF AN ILLUSTRATIVE EMBODIMENT

Figure 1:
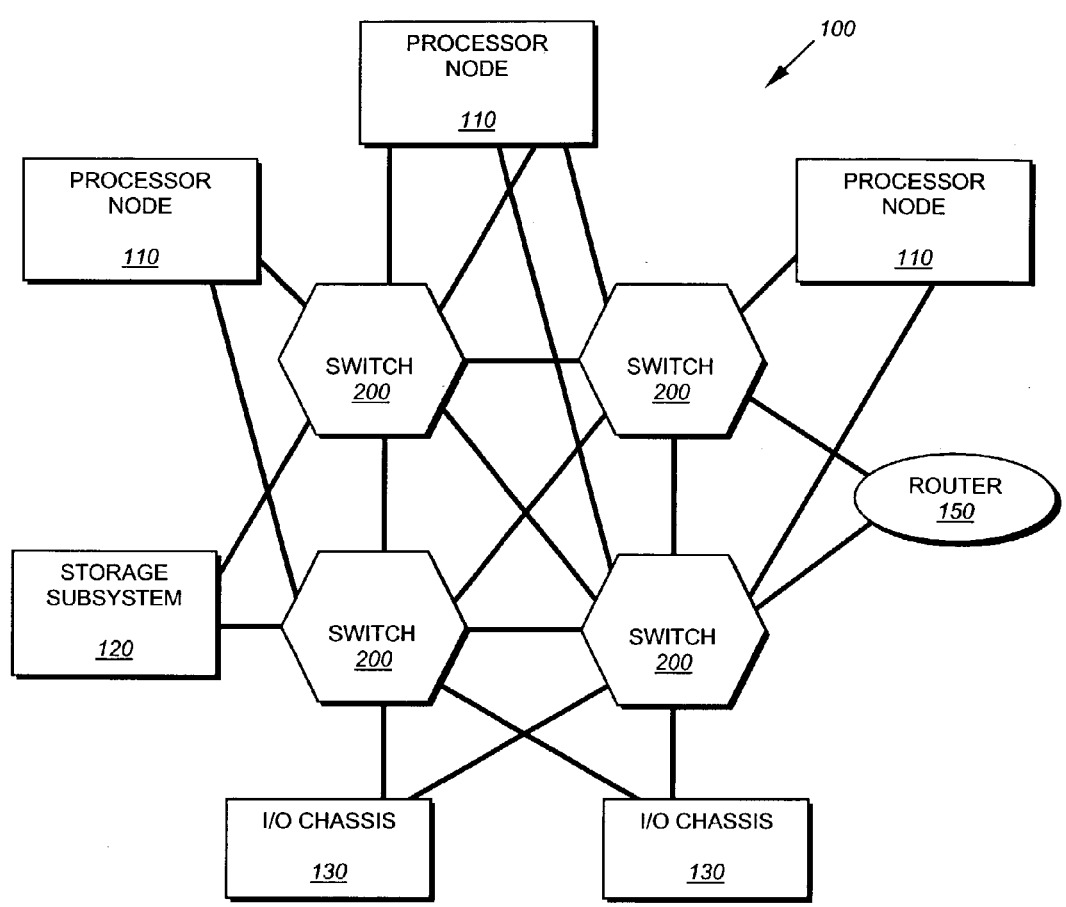
FIG. 1 is a schematic block diagram of a communications network that may be advantageously used with the present invention.

FIG. 1 is a schematic block diagram of a communications network that may be advantageously used with the present invention. The communications network is illustratively embodied as an InfiniBand Architecture (IBA) system area network 100 comprising a plurality of end nodes, such as processor nodes 110, a storage subsystem node 120 and input/output (I/O) chassis nodes 130, interconnected by intermediate network nodes, such an IBA router 150 and IBA switches 200. However, it will be understood to those skilled in the art that the inventive technique described herein may apply to other types of communications networks with end nodes and intermediate nodes that communicate by exchanging discrete packets of data according to predefined protocols. In this context, a protocol consists of a set of rules defining how the nodes interact/communicate with each other. For example, the nodes of communications network 100 communicate by exchanging IBA packets. An IBA packet is an indivisible unit of IBA data transfer and routing consisting of one or more headers, a packet payload and one or two cyclic redundancy checks (CRCs).

Each processor node 110 includes at least one central processing unit, a memory and at least one host channel adapter coupled to a switch 200. The storage subsystem node 120 comprises a collection of storage devices organized in, e.g., a redundant array of inexpensive disks (RAID) configuration and connected to a switch 200 via a target channel adapter (TCA). Each I/O chassis node 130 comprises a collection of I/O modules adapted to provide connectivity to I/O devices and/or other computer networks, such as the Internet, coupled to, e.g., Fibre Channel and/or gigabit Ethernet links. Whereas the router 150 transports IBA packets between subnets of the network, the network switch 200 forwards those packets from one link to another of the same subnet.

Network Switch

Figure 2:
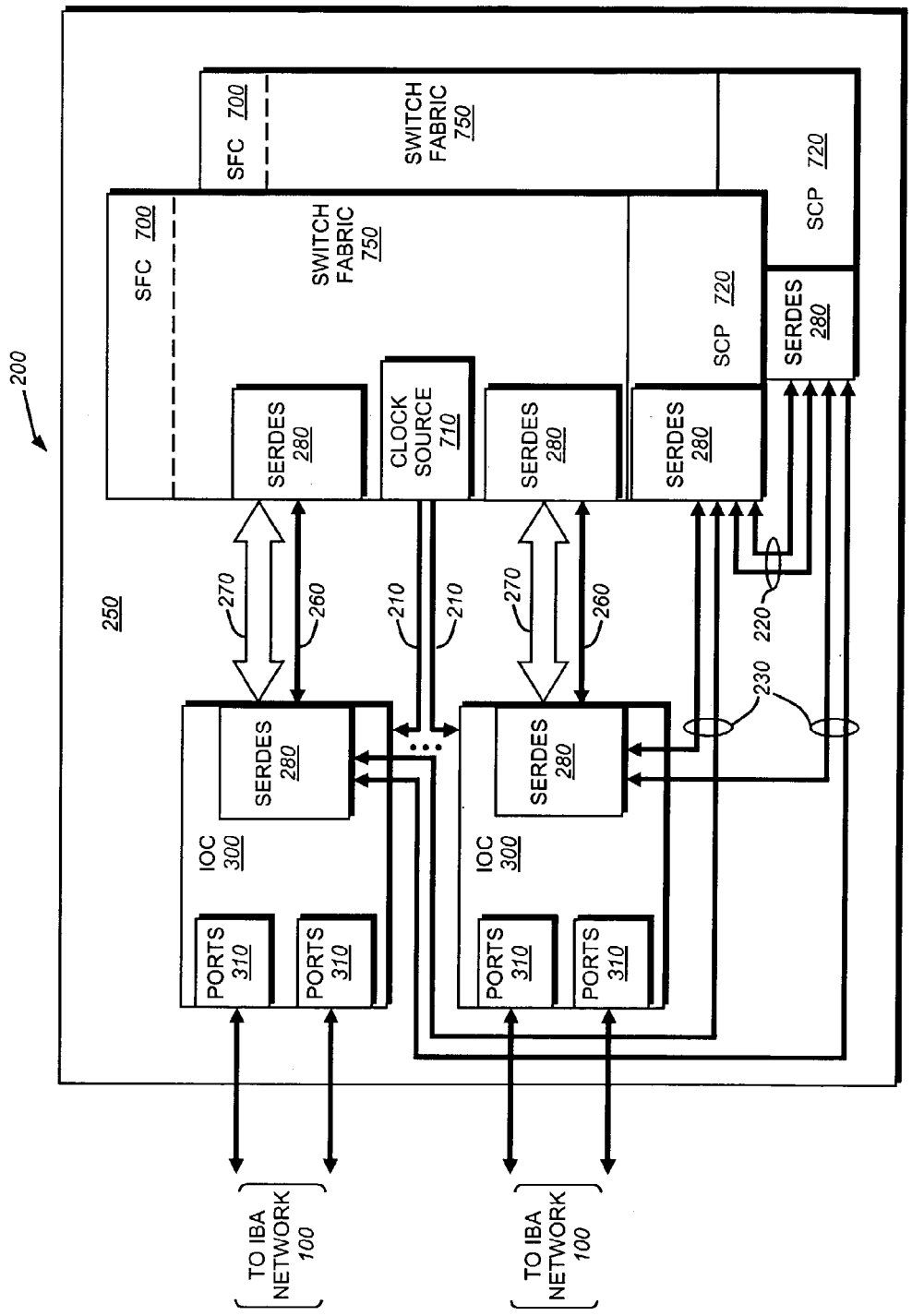
FIG. 2 is a schematic block diagram of a network switch having a plurality of input/output card (IOC) modules coupled to a switch fabric card (SFC) module.

FIG. 2 is a schematic block diagram of switch 200 including a plurality of line card or input/output card (IOC) modules 300 and switch fabric card (SFC) modules 700. An example of a network switch that may be advantageously used with the present invention is the Director Switch available from InfiniSwitch Corporation, Westborough, Mass. The network switch 200 illustratively includes eight (8) IOC modules that connect the switch to the IBA network 100 and two (2) SFC modules 700. Each SFC contains a switch control processor (SCP 720) and a switch fabric 750 organized as a crossbar switch to interconnect data paths between the IOC modules 300 of the switch. Each SFC module also contains a central clock source 710 that distributes synchronous clock signals over radial clock lines 210 throughout the switch for use by logic on the modules. However, it will be apparent to those skilled in the art that other clock distribution methods, such as asynchronous clocking, may be used in connection with the inventive technique described herein.

Both SFC modules 700 are functional and used during normal operation of the switch. The SFC modules and their co-resident system processors (SCPs) cooperate in a redundant arrangement to provide full connectivity and control for the switch in the event of a failure to either module. To that end, the SCP 720 on each SFC module communicates with its redundant SCP 720 over paths 220 to ensure the "healthiness" of each SFC module 700. In that event of a failure, the surviving SFC module assumes switching responsibilities to provide continuous, yet degraded, operation of the switch. Such continuous operation includes remapping of the data paths through the switch fabric 750, along with possible changing of the time-base clocking source, from the failed SFC module to the surviving SFC module.

Although eight IOC modules are described herein, the configuration of the switch may be scaled to accommodate thirty-two (32) IOCs. Each IOC module 300 illustratively includes eight (8) 1× IBA ports 310, wherein each port accommodates 2.0 gigabits per second (Gbps) of data. Specifically, 2.5 Gbps of information are received by an ingress port 310 and are transmitted by an egress port 310; notably, 2.0 Gbps of the information are raw data with the remainder comprising encoding overhead. Therefore, 16 Gbps of data traffic flow are passed through ingress IOCs, forwarded to the SFC module 700 and switched to egress IOCs. Such large amounts of traffic are not feasibly transported over parallel buses of a backplane.

Accordingly, the switch 200 employs serializer/deserializer (SERDES 280) devices to limit the number of physical wires constituting a backplane 250 of the switch. At the interface between the IOC modules 300 and the backplane, these SERDES devices convert parallel data to serial data for transmission over high bandwidth serial links of the backplane 250 to the SFC module 700. SERDES devices located at the interface between the SFC module and backplane re-convert the serial data to parallel data for processing on the module. Serial data transported throughout the switch is converted to parallel data on each module to allow use of, e.g., field programmable gate array (FPGA) devices that are configured to operate with parallel data.

Specifically, each SCP 720 is coupled to each IOC 300 in the switch over a 781.25 megabit per second (Mbps) serial link 230. Each SCP 720 further communicates with its redundant SCP counterpart over two 10 Mbps Ethernet links 220. Data links 270 couple each SFC 700 to each IOC 300, wherein each data link 270 illustratively represents a bundle of four (4) 3.125 gigabit per second (Gbps) serial data links. Request/flow control signals flow over 3.125 Gbps control links 260 between each IOC 300 and each SFC 700. That is, requests for arbitration are passed over these serial control links 260 by IOCs to the SFCs and grants are returned by the SFCs to the IOCs over the links 260. In addition, flow control information provided by output queues of the IOCs to input queues of the IOCs flow over the serial links 260.

IOC Module

Figure 3:
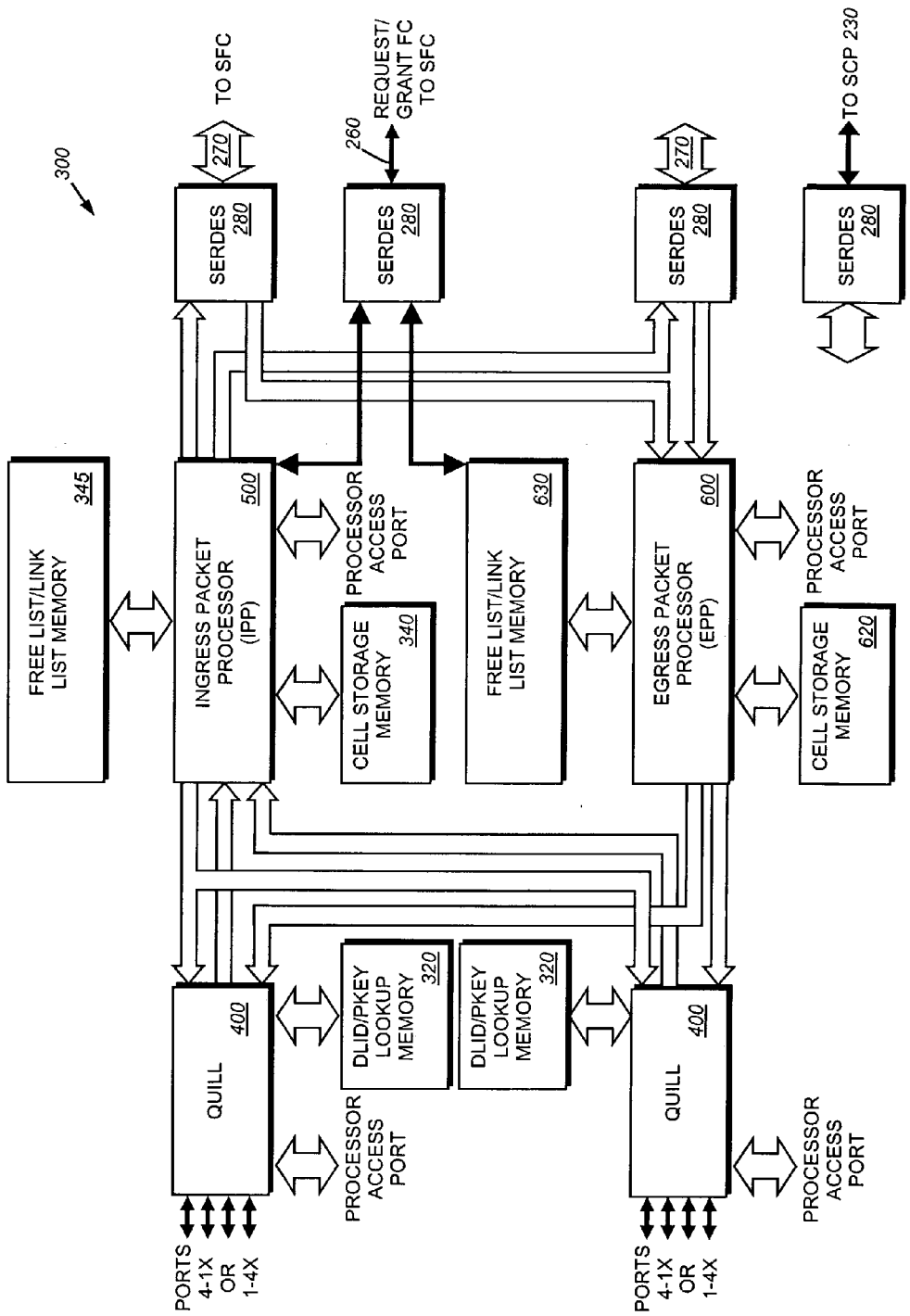
FIG. 3 is a schematic block diagram of an IOC module that may be advantageously used with the present invention.

FIG. 3 is a schematic block diagram of an IOC module 300 that is partitioned into egress and ingress data paths for transmitting and receiving IBA packets to and from the network 100. The IOC may be embodied as one of many different "personality" line cards adapted to receive either 1× or 4× IBA links. In some cases, an IOC may accommodate a 4× and 1× link arrangement. Broadly stated, the ingress data path of each IOC comprises logic that "understands" the format of packet bits received over IBA network links, along with logic that examines headers of the packets and places those packets onto queues that are scheduled for servicing by the crossbar switch fabric. The egress data path of each IOC comprises logic configured to receive a stream of packet cells from the ingress path of an IOC and reassemble those cells into a packet for transmission from the switch. Notably, an ingress path on a particular IOC utilizes the switch fabric 750 to send information to its corresponding egress path on that IOC.

The IOC 300 comprises an egress packet processor (EPP 600) and an ingress packet processor (IPP 500) that cooperate with a plurality of Quad Infiniband Link Layer (QUILL) interface devices 400 to provide egress and ingress buffering and queuing systems for the egress and ingress data paths, respectively. A plurality of SERDES devices 280 is provided to translate data from parallel to serial (and serial to parallel) formats for transmission (and processing) throughout the switch. The QUILL devices 400 also form IBA link interfaces between IBA ports 310 of the IOC module 300 and the IBA network 100. There are illustratively two QUILL devices per IOC, wherein each QUILL 400 is configured to operate with a physical device interface, such as a TCA, that provides, e.g., Fibre Channel or gigabit Ethernet link connections to the switch. However, native IBA links can also be coupled to the switch via each QUILL.

In the illustrative embodiment, each QUILL 400 forms either a 4×, 10 gigabit per second (Gbps) IBA link interface or four (4) 1×, 2.5 Gbps link interfaces that connect to either 4× or 1× IBA ports 310 of the switch 200. If the IOC operates in a 1× mode and data flows into the IOC over a 4× bundle of IBA links, the bundle is apportioned into four 1× data stream flows at an IBA physical device interface of the IOC. These four data streams over the four 1× links are interleaved for storage in the ingress buffering and queuing system. If the IOC operates in a 4× mode, i.e., where the 10 Gbps packet is not apportioned into four 2.5 Gbps streams, there is only a single stream presented to the buffering and queuing system and no interleaving is required.

Figure 4:
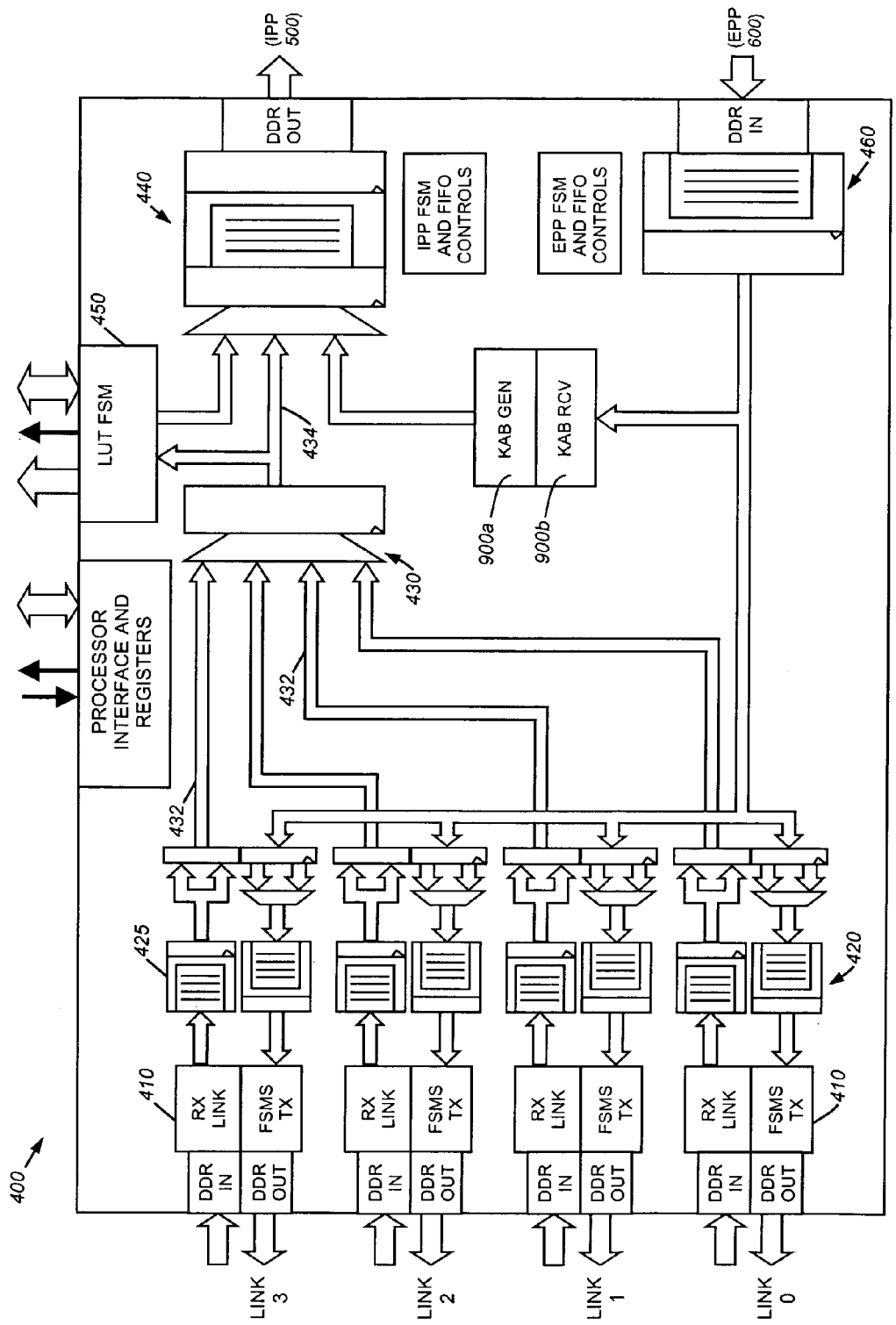
FIG. 4 is a schematic block diagram of a Quad Infiniband Link Layer (QUILL) that may be advantageously used with the present invention.

FIG. 4 is a schematic block diagram of a QUILL 400 comprising a link function that provides IBA layer 2 operations for each data flow entering the IOC. The link function includes state machine and look-up engine logic that cooperate to provide a look-up operation on an IBA packet received at the IOC to identify a storage location within the ingress buffering and queuing system of the IOC. Each QUILL comprises a plurality of, e.g., four, link finite state machines (FSMs), each coupled to a link/port serviced by the QUILL. The link FSMs are connected to a buffering system 420 comprising a plurality of first in/first out (FIFO) buffers 425.

An ingress data path of the QUILL (i.e., ingress QUILL) comprises a receiver (Rx) FSM 410 or "deframer" that performs error checking and CRC checking on IBA packet data received from the network. An ingress portion of the FIFO buffering system 420 is configured to store the packet data and forward that data to inputs 432 of a selector circuit 430. An output 434 of the selector is coupled to a double data rate (DDR) bus system 440 arranged to pass the data to the IPP 500. In addition, the Rx FSM 410 extracts headers from the received packets to perform lookup operations into a lookup memory 320 using DLID and protection key (PKEY) index values of the headers in connection with a lookup table (LUT) engine FSM 450. As a result of the lookup operation, the DLID/PKEY index values are translated to a virtual output queue (VOQ) in the ingress buffering and queuing system. The ingress QUILL then forwards the received packet to the IPP on the ingress path.

Figure 5:
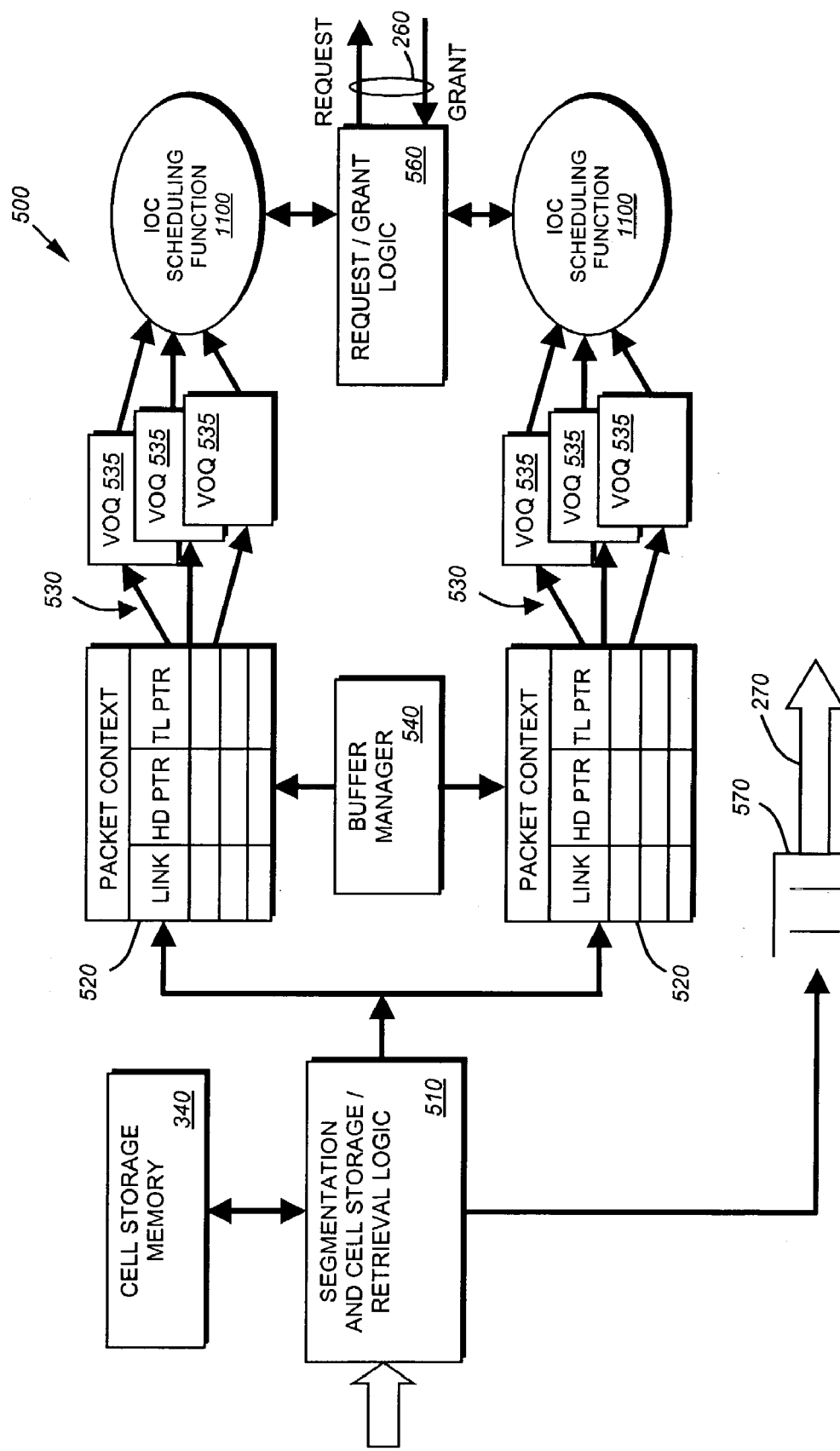
FIG. 5 is a schematic block diagram of an ingress packet processor (IPP) that may be advantageously used with the present invention.

FIG. 5 is a schematic block diagram of the IPP 500 comprising logic 510 configured to segment and store a received packet as fixed size, 64-byte cells. The 64-byte cell size is reflective of a credit used in flow control for the IB architecture. Each packet is characterized as a data flow based on the IBA input port 310 at which the packet is received at the IOC. The packet data flow is segmented into the fixed size cells and stored in an external ("off-chip") ingress cell storage memory 340. Those stored cells are then enqueued onto VOQs 535 of a queuing system 530. Specifically, the IPP maintains a free list of 64-byte buffers in free list/link list memory 345 that are linked together to form a linked list of cells of a packet context 520. A packet context is an internal (i.e., within the switch) representation of a flow of cells associated with a packet. Once the linked list is formed, a head of the list is linked onto a VOQ 535 for transmission over the switch fabric 750. The queuing system 530 of the IPP is flexible enough such that all buffers may be destined to a particular VOQ or apportioned among many VOQs.

Buffering and queuing on the ingress data path is based on a destination output virtual lane (VL) and output port. A VL is defined by the IB architecture as a basis for link level flow control. Each IB link preferably has 16 defined VLs; one VL is used for management traffic and the remaining 15 VLs are used for data traffic. The virtual lane concept has a significant role with respect to credits and congestion among switches in an IBA network. For example, an upstream node (such as another transmitting switch 200) within the IBA network 100 monitors buffer utilization in the switch. Within an IOC 300, credit information ("credits") flows from the IPP 500 back to each QUILL 400. In response, each QUILL generates a link packet using the credits received from the IPP and forwards that packet back to a transmitting node from which a previous packet was received at the switch. The credits contained in the link packet indicate to the transmitting node whether there are sufficient buffers (credits) for that node to send another packet.

The ingress queuing system 530 of the switch is organized into VOQs 535, which are dependent upon the VLs and output ports on each IOC in the switch. Thus, each VOQ is associated with an output VL and an output port. Notably, there is a distinction between an input VL and an output VL, and the IBA specification provides a translation process for translating an input VL to an output VL. In the illustrative embodiment, each IOC has 64 ports with 16 VLs per port for a total of 1024 VOQs that are loaded by buffer manager logic 540 with cells destined for switching at the switch fabric. The VOQs are scheduled for servicing in the switch according to an IOC scheduling algorithm implemented by a scheduling function 1100. The scheduling function enables each IOC to arbitrate on a per VL/queue basis for access to the switch fabric 750 in order to transfer data.

Although the IOC includes output queues, the architecture of the switch is primarily directed to an input buffering and queuing system. It is desirable to keep the output queues as shallow as possible. Flow control in the switch is configured to convey flow control information from output ports back to input ports of the switch. That is, information is fed back from each output IOC (each output VL on each output port) back to the ingress path of each IOC to effect arbitration and the manner in which cells are forwarded through the switch.

Figure 6:
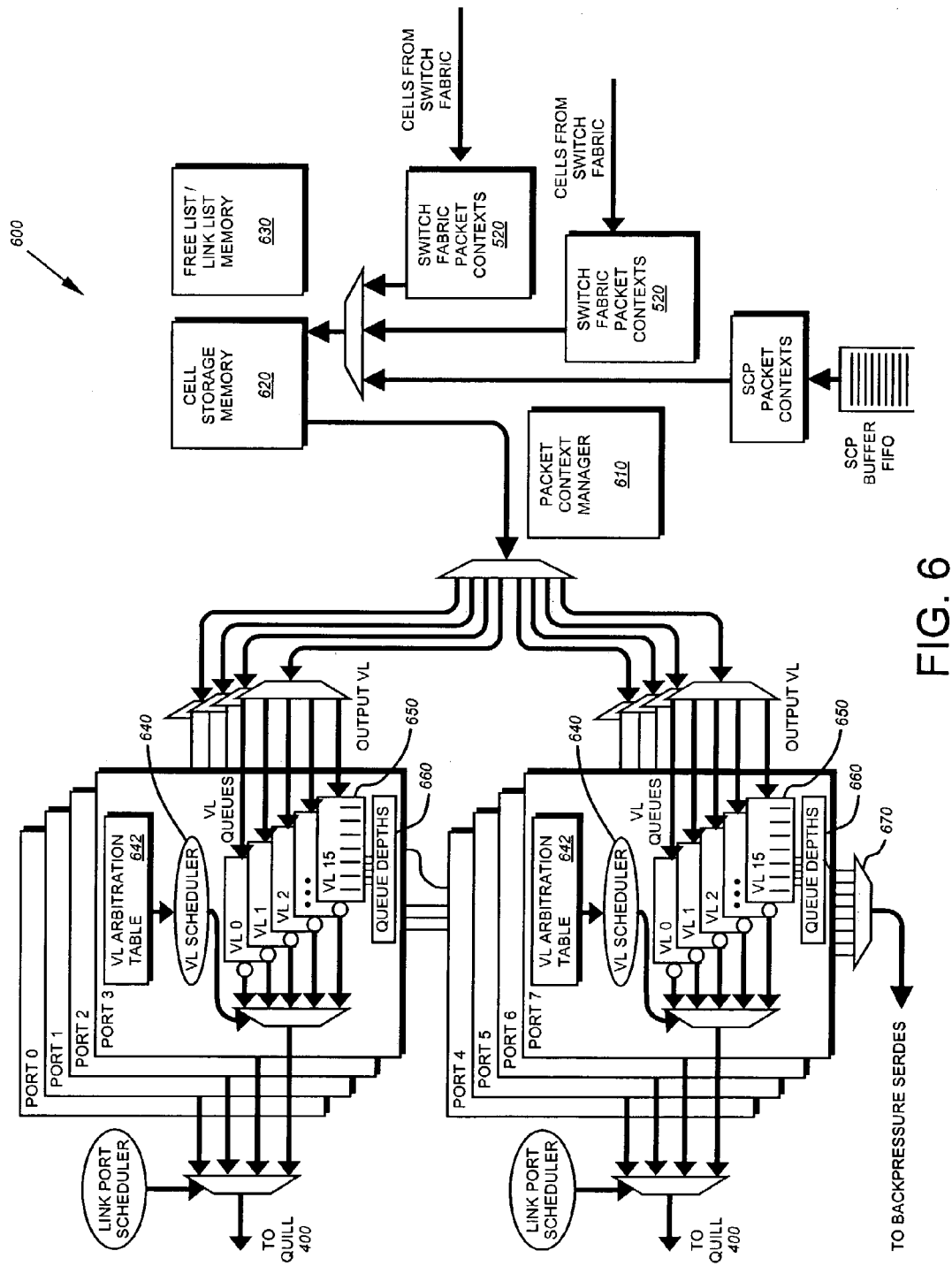
FIG. 6 is a schematic block diagram of an egress packet processor (EPP) that may be advantageously used with the present invention.

FIG. 6 is a schematic block diagram of the EPP 600 comprising logic configured to receive and process a stream of cells switched by the switch fabric 750. The EPP resides on the egress data path of each IOC and comprises one output queue for each output VL for each output port on the IOC. In the illustrative embodiment, there are eight output ports with 16 output VLs per port for a total of 128 output queues on each egress path of the IOC. The stream of cells is stored in selected buffers of cell storage memory 620 until the cells are linked in a particular context for transmission from the switch over an egress link. As cells are received at the IOC from a switch port of the fabric, up to eight (8) contexts (one from each IOC) may be controlled by the EPP 600.

A packet context manager 610 manages reassembly of cells into a packet context 520 using cell storage memory 620 and free list/link list memory 630, as described with the IPP. The cells of packets are fully stored in the cell storage memory 620, where they are retrieved in accordance with a VL scheduler 640 configured to perform a scheduling function using a VL arbitration table 642 (as defined by the IBA specification) and head information located on output VL queues 650 of each port. The head information pertains to packets stored in cell storage memory 620 for transmission over the egress links. Using the predetermined VL arbitration table 642, the VL scheduler 640 selects a packet for transmission over the egress link.

The selected packet is removed from the output queue 650 and transferred from the EPP 600 to the QUILL 400. Referring again to FIG. 4, a packet context is received over a DDR bus system 460 from the EPP 600 and forwarded over an egress path of the QUILL (i.e., egress QUILL). The packet context flows over the egress path through an egress portion of the FIFO buffering system 420 to a transmitter (Tx) FSM 410 or "framer". From there, the packet is forwarded over egress links of the switch.

SFC Module

Figure 7:
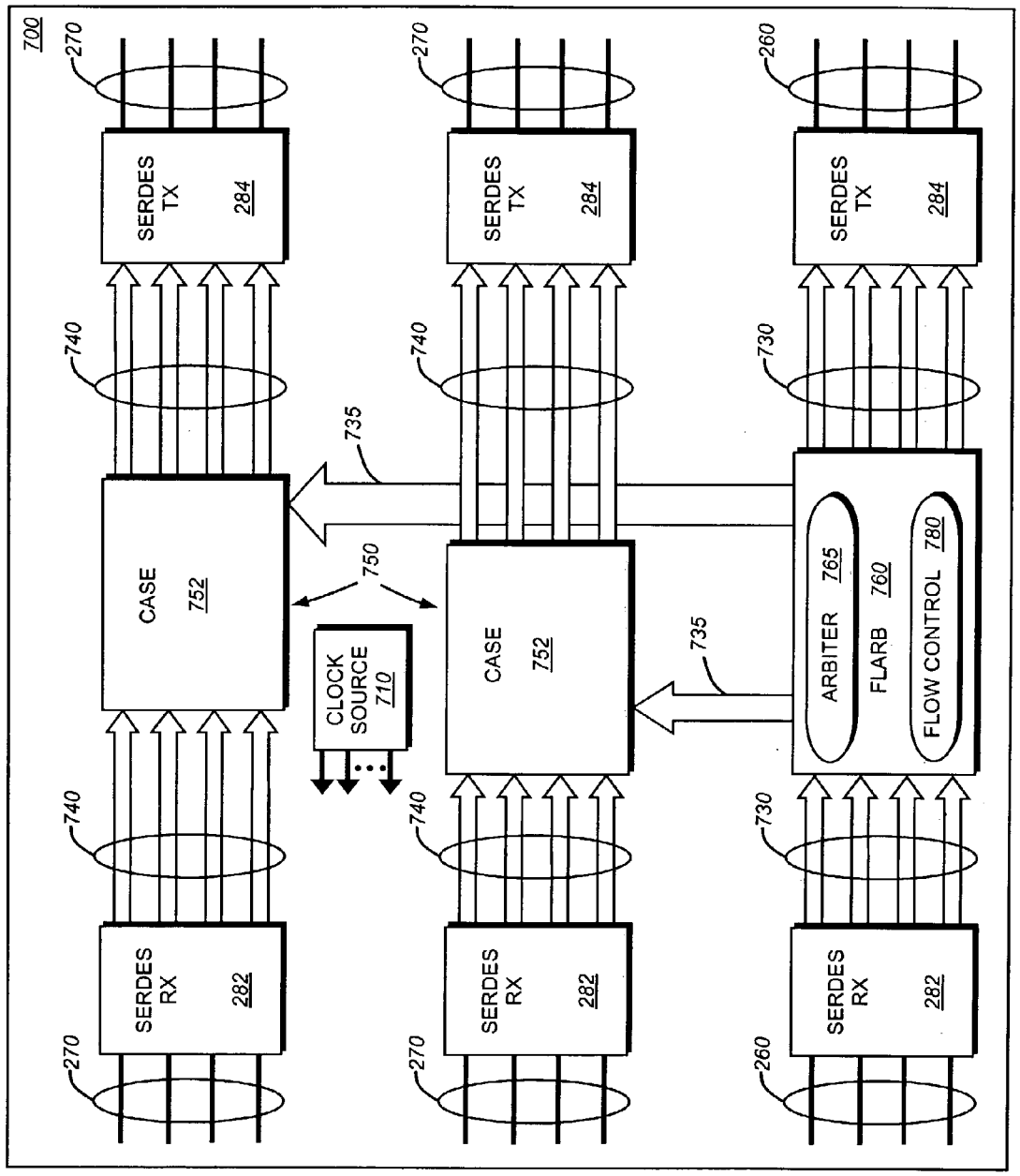
FIG. 7 is a schematic block diagram of the SFC module that may be advantageously used with the present invention.

FIG. 7 is a schematic block diagram of the SFC module 700 comprising a clock source 710 and a switch fabric 750. The switch fabric 750 interfaces to the IOC modules 300, a flow control and arbiter (FLARB) device 760 and various SERDES devices 282, 284 (generally shown at 280). The switch fabric 750 preferably comprises two 10×10 cell alignment and switch engine (CASE 752) crossbar devices coupled to non-integrated receive (SERDES Rx 282) and transmit (SERDES Tx 284) devices that translate data from serial to parallel (and parallel to serial) formats. The FLARB 760 comprises a flow control mechanism 780 and a central arbiter 765 that controls both CASE devices 752 on the SFC 700 to, among other things, keep them in synchronization. Notably, the redundant SFC module 700 in the switch is not synchronized with its counterpart SFC module.

Operationally, request/grant logic 560 (FIG. 5) of an IOC 300 sends a request over a control link 260 to the arbiter core 765 embodied on the FLARB device 760. The SERDES Rx device 282 receives data over a plurality of (e.g., four) high-speed serial data links 260 and transposes it to data over a parallel bus 730 operating at a lower frequency that can be handled by conventional FPGA logic. In particular, the SERDES device 282 translates serial data into parallel data and forwards that data to the arbiter 765, which implements a conventional SLIP arbitration algorithm. The arbiter 765 renders a decision based on all the requests received from all the IOCs and resolves any conflicts that may arise. In response, the arbiter issues grants over bus 730 that are converted by the SERDES Tx device 284 for transmission over links 260 to the logic 560 on the IOCs. Subsequently, the FLARB 760 issues configuration information to each of the CASE devices 752 over independent control lines 735 between the CASE and FLARB devices.

The configuration information comprises control information that instructs each crossbar device 752 to connect an input switch port to an output switch port of the switch fabric at a particular time. The configuration information essentially synchronizes the switch such that ingress source IOCs transmit cells to the switch fabric 750 over serial links 270 for transmission to egress destination IOCs. Since the switch is based on synchronous switching, all arbitration, data transmission and switching aspects of the crossbar devices 752 are synchronized across those serial links, which are thereafter transposed into parallel links 740. The cells switched by the SFC 700 are then forwarded to the EPPs 600 of destination IOCs 300.

Keep Alive Buffer (KAB)

The invention is directed to an online system monitoring technique that quickly and efficiently identifies failures or other system errors arising during operation of an intermediate network node, such as network switch 200. The technique comprises Keep Alive Buffer packets/cells ("KABs") that exercise data and control paths extending from every ingress port to every egress port in the switch. By exercising the data and control paths, the KABs enable testing of, and ensuring against, component failures, missing modules or other types of failure that can be detected as soon as possible, to thereby prevent data flow backup or other performance degradation in the switch.

Broadly stated, each KAB is generated and injected into the data path of the switch by ingress QUILL logic, and is subsequently extracted and checked by egress QUILL logic. The KAB is injected into the data path at a low frequency that essentially "hides" the KAB behind the overhead of a link protocol and does not generally interfere with normal operating traffic. The injected KAB traverses the data path between the ingress and egress ports (QUILLs) at line rate, similar to a packet that is received at, switched and forwarded from the switch. By traversing the data path between the ingress and egress QUILLs, the KABs exercise all major physical data and control paths of the switch. That is, the KABs exercise the ingress buffering and queuing system, the request and grant control paths, the SERDES serial links and transceivers, the switch fabric operation, the egress buffering and queuing system, and the scheduling functions of the switch. Other than the ingress and egress QUILLs, the logic of the switch treats the KABs as any other data packet/cell forwarded through the switch.

The KAB is a minimum size IBA packet that is generated by a KAB generator 900a of an originating ingress QUILL. The minimum size packet comprises a single cell and is processed like any other IBA packet flowing through the switch. As valid minimum size packet defined by the IBA, the KAB has a size of 24 bytes comprising 8 bytes of local route header, 12 bytes of transport header, 0 bytes of payload and 4 bytes of packet start/end symbols and cyclic redundancy check (CRC) code. The packet start/end symbols are illustratively removed at points where the KAB exists, so the 24-byte IBA minimum size packet is essentially equivalent to a 22-byte KAB.

Figure 8:
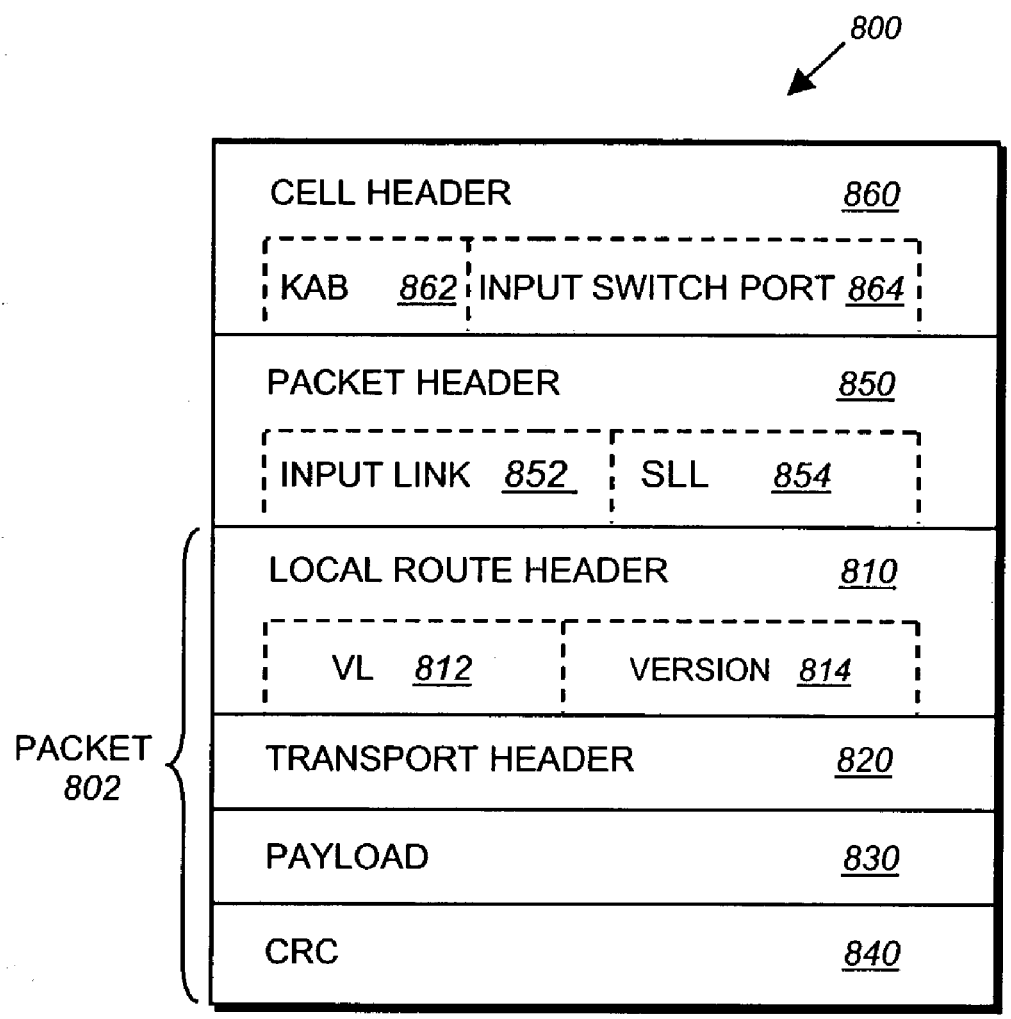
FIG. 8 is a schematic block diagram illustrating the format of a Keep Alive Buffer (KAB) in accordance with the present invention.

FIG. 8 is a schematic block diagram illustrating the format of a KAB 800. Note that only pertinent fields of the KAB are illustrated. The KAB 800 comprises a minimum size KAB packet 802 having a local route header 810 with a 4-bit virtual lane (VL) field 812 containing a number from 0 to 15 that specifies the VL over which the KAB travels. A KAB version field 814 contains a 4-bit constant that allows future KAB formats to differ and co-exist with the present KAB format. A transport header 820 does not include any fields pertinent to the KAB and, as noted, there are zero (0) bytes of payload 830. CRC field 840 contains a 16-bit internal checksum that encompasses the entire contents of the packet 802.

Upon generation by the KAB generator, the minimum size packet 802 is forwarded to the IPP 500 where a packet header 850 is affixed to the packet. The packet header 850 comprises a 4-bit input link field 852 containing a value of an input (source) link port originating the KAB. In the illustrative embodiment, only 1 bit of the input link field 852 is used to identify the QUILL 400 originating the KAB 800. A switch lifetime limit (SLL) field 854 contains a 32-bit timestamp indicating when the KAB was created.

The timestamp is generated from a count value that is synchronized among all IOCs; therefore, the timestamps are equivalent for all IOCs in the system. The switch fabric 750 generates the count value and passes it to all IOCs every 4 usecs. The count value is carried as side band bits on the control links 260, i.e., those links that carry the request/grant and flow control bit stream information to the IOCs. The control bit stream information is illustratively apportioned into "control" cells. Certain lines (or fields) of the control cell carry flow control, grant information, overhead and timestamp (or SLL counter) values.

The IPP 500 then transforms the minimum size packet 802 into a cell, as is the case for all packets processed by the switch. The IPP affixes (e.g., prepends) a cell header 860 onto the packet 802 prior to forwarding the cell (hereinafter "KAB 800") to the switch fabric 750. The minimum size packet is identified as a KAB 800 by assertion of a KAB bit 862 in the cell header 860 of the packet. The cell header 860 also includes a 5-bit input switch port field 864 containing a value of an input (source) switch port originating the KAB. In the illustrative embodiment, only 3 bits of the input switch port field 864 are used to identify an IOC 300 functioning as the source switch port of the switch. Thus, there is a total of 4 bits between the 3-bit input switch port field 864 and 1-bit input link field 852; the KAB receiver uses the contents (values) of these fields to identify one of the sixteen sources of the KAB.

According to the invention, the KABs 800 are manifested in two forms: FastKABs and SlowKABs. A FastKAB is a minimum size packet that is generated by the KAB generator 900a of an ingress QUILL on a source IOC. FastKABs are preferably generated and "launched" automatically by switch hardware such that they are constantly flowing throughout the switch to provide a periodic check of the switch. That is, the FastKAB traverses the ingress buffering and queuing system of the source IOC, and is associated with requests and grants that enable it to be switched through the switch fabric 750. The FastKAB also traverses the egress buffering and queuing system of a destination IOC and is intercepted immediately before the egress IBA links by a KAB receiver 900b of an egress QUILL of the destination IOC. Only the reception of the KAB is recorded by the egress QUILL.

SlowKABs are initiated by software (executed by the SCP 720) to thereby enable further diagnosis of a potential failure in the switch 200. For example, a SlowKAB may be generated in response to a FastKAB failure, insertion of a new module within the switch, a non-responsive module to processor access or any other event that requires generation of such a processor-initiated diagnostic tool. A SlowKAB can be injected into the switch by software at any time. As with the FastKAB, the test coverage of the SlowKABs may extend to the buffer and queuing structures of the switch, in addition to the switch fabric 750 and the arbiter 765.

Two differences between SlowKABs and FastKABs are (1) FastKABs are generated automatically by the hardware (logic), whereas SlowKABs are generated only upon processor request and (2) the flow or, in IBA terminology, the virtual lane (VL) over which the KABs travel. As noted, there are sixteen VLs of which fifteen, e.g., VLs 0–14, are used for data and one, e.g. VL 15, for control/management traffic. In the illustrative embodiment, FastKABs and SlowKABs can travel over any VL with the exception that they do not travel over the same VL. A switch may utilize only a subset of the data VLs, e.g., VL 0, for data traffic, as well as VL 15 for control traffic. The KABs can then be allowed to run over those unused VLs without interfering with data or control throughput.

KAB Generator and Receiver

Figure 9:
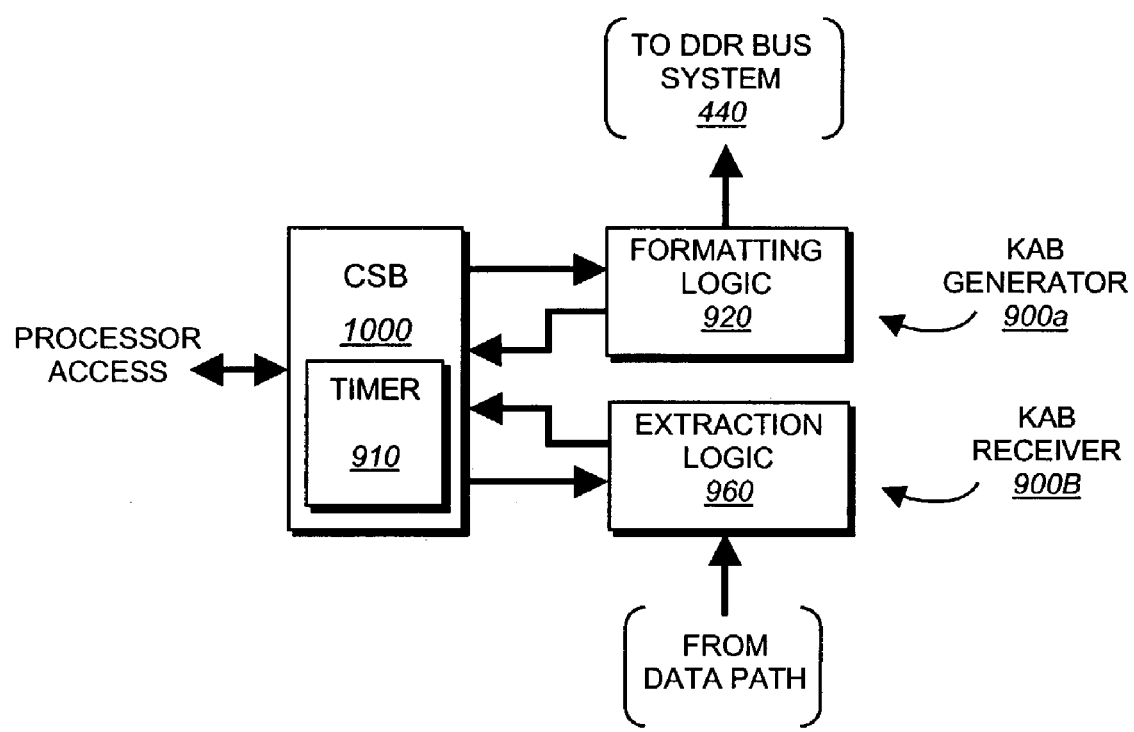
FIG. 9 is a schematic block diagram of KAB generator and receiver logic in accordance with the present invention.

FIG. 9 is a schematic block diagram of the KAB generator 900a and KAB receiver 900b comprising a KAB Control and Status Block (CSB) data structure 1000 containing a plurality of registers that hold information relating to the generation of, along with diagnostic information acquired by, the KAB 800. As described further herein, one of the registers is configured as a timer 910 that determines when to generate and send a KAB. The generator 900a also includes formatting logic 920 configured to generate the KAB. To that end, the formatting logic 920 is configured to reset the timer 910 when it expires, format the KAB 800 using the information stored in the registers and, in cooperation with DDR bus system 440, inject the KAB into the data path/stream. The KAB receiver 900b, on the other hand, includes extraction logic 960 that "siphons off" a KAB received at the egress QUILL. In particular, the KAB receiver extraction logic 960 intercepts the KAB 800 from the data path instead of transmitting it over an egress link, examines the contents of the extracted KAB and updates information stored in result memory registers of the CSB 1000. Note that, in the illustrative embodiment, the KAB generator and receiver logic is implemented in a FPGA device.

KAB Registers

FIG. 10 is a schematic block diagram of the KAB CSB 1000. The CSB contains a plurality of data structures embodied as registers, including a FastKABEnable register 1010, a FastKABTiming register 1020, a FastKABControl register 1030, an AllKABResults register 1040, a FastKABResults register 1050 and a SlowKABControl register 1070. The FastKABEnable, FastKABTiming and FastKABControl registers pertain to FastKABs generated by the KAB generator, while the SlowKABControl register pertains to SlowKABs generated by the KAB generator 900a. The contents of the FastKABEnable, FastKABTiming, FastKABControl and SlowKABControl registers are all under processor (SCP) read/write access. That is, the processor reads and writes (preconfigures) the contents of those registers. Once these registers are configured (loaded) by software executed by the processor, the KAB logic automatically generates the FastKABs based on the information. The hardware logic never modifies those registers; it only uses the values.

The FastKABEnable register 1010 specifies the destination in the switch to which FastKABs are sent and the source in the switch from which to expect FastKABs to be received. In the illustrative embodiment, software loads this register with a vector of QUILLs and IOCs present in the switch; those devices that are present are able to receive the KABs. As noted, there are two QUILLs per IOC and eight IOCs in the switch; thus, a vector of 16 bits is sufficient to represent all QUILLs (or ports) that can receive KABs. The FastKABEnable register 1010 is illustratively a 32-bit register of which the upper 16 bits are reserved and each of the lower 16 bits specifies a particular QUILL and port.

The FastKABTiming register 1020 is a 32-bit register that includes a 4-bit field 1022 containing a programmable, registered parameter that functions as timer 910 to specify the frequency at which the FastKABs is checked, i.e., a FastCheckPeriod. At the extraction logic 960 of the KAB receiver 900b, reception of FastKABs is recorded and, if a FastKAB is not received within the FastCheckPeriod, an interrupt "flag" is generated to provide automatic failure notification of this event to the system processor (SCP). The FastCheckPeriod allows the system processor to determine the frequency at which the results are checked, thereby limiting the maximum response time to detecting a failure. Note that the interrupt is generated if no KABs are received during the FastCheckPeriod; yet, there can be more than one KAB received during that period and, as a result, a logical ORing function may be provided to record that event.

The FastKABTiming register 1020 also includes a 24-bit field 1024 containing a programmable, registered parameter that specifies the frequency at which FastKABs are generated, i.e., a FastGeneratePeriod. Note that it is possible to set the FastCheckPeriod equal to the FastGeneratePeriod to ensure reception and checking of every KAB; that is, every time a KAB is generated, a check is performed to ensure that the KAB was received. If the CheckPeriod is set to twice the FastGeneratePeriod, then reception of one KAB is checked for every two KABs generated. This approach can be extended to check reception of KABs in a manner that accommodates unpredictable latency within the switch, e.g., bursts of packets causing various latencies.

The FastKABControl register 1030 is a 32-bit register that includes a 4-bit FastVL field 1034 holding a value that specifies the VL over which FastKABs are transmitted. A 1-bit FastEnaGenerate field 1038 enables auto generation of FastKABs, while a 1-bit FastEnaIntKABs field 1036 enables interrupt upon detection of missing FastKABs. The FastKABControl register 1030 also includes a 6-bit FastCreditLimit field 1032 that specifies a credit limit applied to each link (or destination). The credit limit applies to the ingress buffering system and essentially reserves a plurality of buffers for each destination so that each destination has its credits accounted for independently. Separate credit accounting per destination prevents a fault at a single destination from very quickly consuming all destinations' credits, which would result in all destinations immediately declaring missing KABs, thereby hiding the original single fault.

The AllKABResults register 1040 provides readable state as to the number of KABs received on particular VLs. The content of the AllKABResults register is an absolute count of the number of KABs received on a VL, apportioned per source (KAB generator 900a). This register 1040 can be read by the SCP 720 to determine the number of KABs received at a KAB receiver 900b from each source KAB generator 900a on each VL at any time.

In the illustrative embodiment, there are sixteen AllKABResults registers 1040, one for each VL, wherein each register records the number of KABs received on that VL since the last time the register was cleared. Each AllKABResults register is illustratively 16 words (64 bytes) in length, wherein each word is 4 bytes and each word has two fields (and two reserve fields). For each switch port and QUILL, a 10-bit field 1042 indicates credits used. A fault in the ingress buffer system that is not returning credits can be diagnosed using field 1042. A 10-bit field 1044, for the same switch port and QUILL, indicates a received KAB count. That is, the content of field 1044 indicates how many KABs are received.

The fields described above are illustratively implemented as a saturating count, wherein the contents of the register increment from 0 to the maximum and then stay at the maximum count e.g., $2^{10}$. The remaining fields of the register are organized for the different sources up to sixteen. Note that the register is associated with one VL from all sources and the other 15 registers are identical copies, just for different VLs (for a total of 16 registers). As noted, the KAB generator and receiver logic is illustratively implemented in a FPGA device; this device includes one memory that is shared between ingress and egress data paths. Accordingly, the receive KAB count field 1044 is located in the KAB receiver 900b, while the credits used field 1042 is located in the KAB generator 900a.

The FastKABResults register 1050 provides a summary of the AllKABResults register 1040 directed to FastKABs (which typically travel over VL 15, but could be any VL). The FastKABResults register provides FastKAB results in a summary register that is much shorter than the AllKABResults register, i.e., the FastKABResults register is only one word in length instead of 16 words for the AllKABResults register. Specifically, the FastKABResults register is a 32-bit register wherein the upper 16 bits are reserved and each of the lower 16 bits is associated with a port and QUILL of the switch. As a result, the FastKABResults register 1050 is generally accessed in response to an interrupt that is generated because, e.g., FastKABs are missing at a particular receiver. The register 1050 can be quickly and efficiently accessed (read) to indicate exactly from what source KABs are not received.

As FastKABs are received at a particular egress IOC, the KAB receiver 900*b* records the source (KAB generator 900*a*) from which the KABs are sent in the appropriate bit position of the register 1050. If any KABs are missing, the FastKABResults register 1050 can read to determine from which source the missing KABs were sent. These missing KABs are recorded for a particular period, e.g., the FastCheckPeriod as specified by the timer 910. Thus, when the timer 910 expires, the contents of the FastKABResults register 1050 are examined to determine the number of FastKABs that have arrived from the last time the timer expired. If any KABs are missing from any sources, a corresponding bit is set in the FastKABResults register. The contents of the FastKABResults register are then cleared. The contents of the AllKABResults register 1040 are cumulative for SlowKABs to ensure that every SlowKAB is forwarded through the switch. The AllKABResults register 1040 is generally not used for FastKABs.

In essence, the FastKABResults register 1050 is the result of the FastCheckPeriod and the bits in the register are "sticky". A hidden register 1060 is located "behind" the register 1050; this hidden register is not accessible by the processor. The format of the hidden register 1060 is identical to that of the FastKABResults register 1050. The contents of this hidden register 1060 are cleared every FastCheckPeriod and each bit gets set when a KAB arrives. The results of the hidden register 1060 are parsed every FastCheckPeriod and those results are updated into the FastKABResults register 1050 because there may be some latency associated with the processor accessing the register; i.e., it may be more than a FastCheckPeriod before the processor accesses the register. The hidden register 1060 thus prevents overwriting of the results that caused the interrupt by the next results.

The SlowKABControl register 1070 is used to control generation and launching of SlowKABs, and is generally similar to the FastKABControl register 1030 with a couple of exceptions. For example, there is no automatic generate, but rather a 1-bit SlowInject field 1072 that is a "read/write 1 to trigger" which means that if the bit is written as a "1", a SlowKAB is generated and sent with the parameters in this register. These parameters are stored in the lower eight bits of the register and include a 4-bit SlowVL field 1075 specifying a destination (internal) VL, a 3-bit SlowDestSwf-Port field 1076 specifying a destination port and a 1-bit SlowDestQuill field 1078 specifying a destination QUILL. SlowCreditFree and SlowCreditLimit fields 1073, 1074 are similar to corresponding parameters in the FastKABControl register. The content of the SlowCreditLimit field 1074 is identical to that of register 1030; i.e., 64 credit blocks. The SlowCreditFree field 1073 contains a summary indicating the number of credits that are available overall for all SlowKABs on all VLs.

The FastKABs and SlowKABs have different credit pools so as to avoid interfering with the automatic FastKABs that are running when diagnosing SlowKABs. Therefore, these KABs work from different credit pools or different credit counts. Each pool reserves its own credit and each is independent. As noted, the credits (or buffers) are reserved at the ingress buffering system in the IPP 500.

Operation

Figure 11:
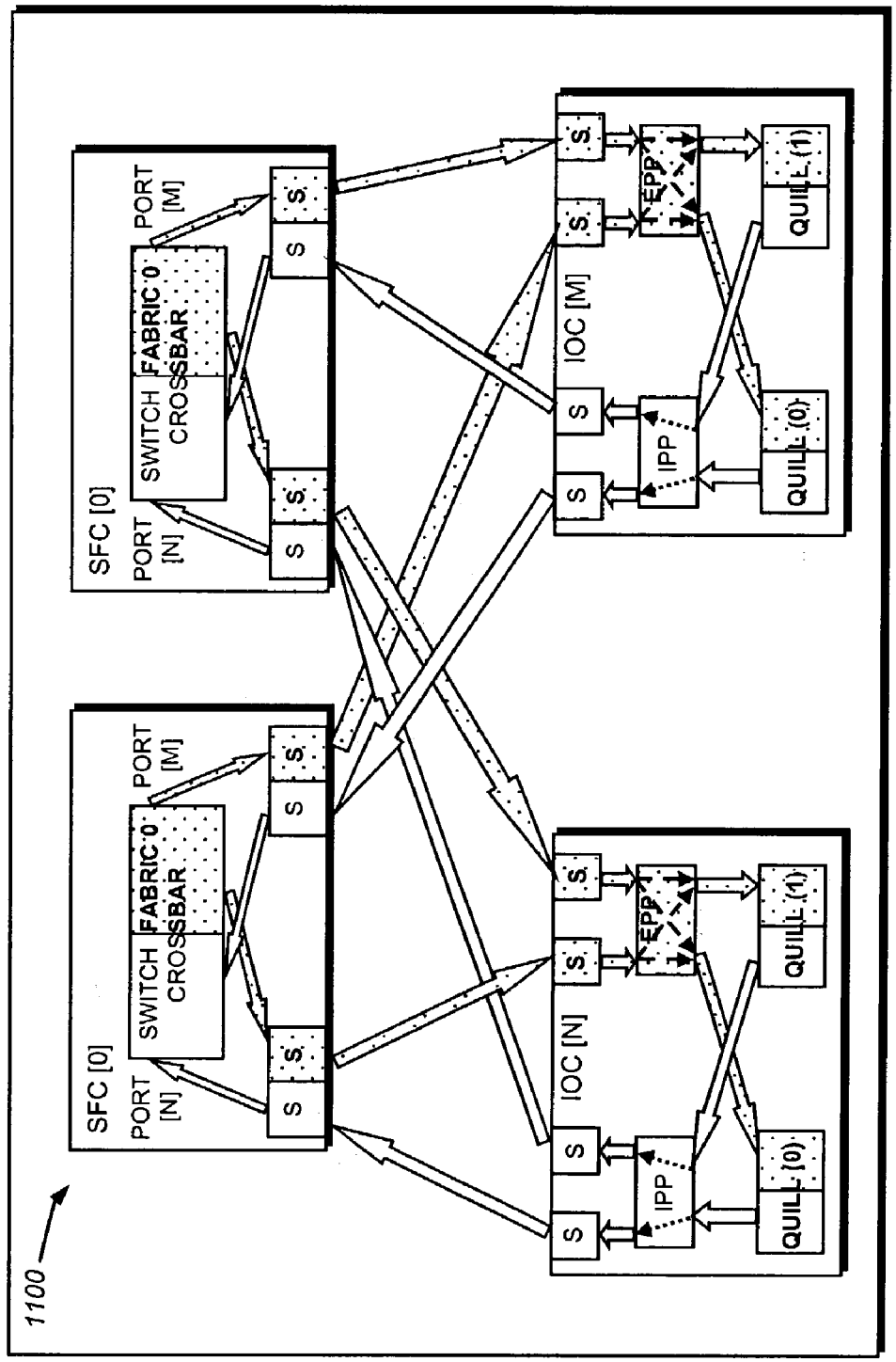
FIG. 11 is a schematic block diagram illustrating data path test coverage provided by the KABs within the network switch of FIG. 2.

FIG. 11 is a schematic block diagram illustrating the data path test coverage 1100 of KABs within the switch 200. KABs are injected into the data path inside the ingress QUILL immediately before the IPP interface, and are extracted from that path inside the egress QUILL immediately after the EPP interface. The internal paths of the QUILLs 400 are generally not part of the test coverage provided by the KABs 800. That is, diagnostic coverage does not extend to the link engines and forwarding lookup engines/tables as those components are located in portions of the QUILL where the presence of KABs would interfere with line rate traffic. KABs are injected at rate guaranteed to be less than the incoming link flow control packet rate, so they do not cause any ingress line-rate storage issues. KABs are extracted in the over-speed domain egress logic, so their presence does not cause "holes" in egress output link utilization.

Specifically, an ingress QUILL launches the FastKABs at a periodic, low rate that is less than the flow control overhead on an IBA link. Introduction of FastKABs into the switch generally does not interfere with the data throughput of the switch. For example, flow control packets received at the switch terminate at the ingress QUILL. These flow control packets are replaced by FastKABs that flow throughout the switch without affecting the data traffic received and forwarded throughout the switch. An egress QUILL is enabled to receive FastKABs from every ingress QUILL in the switch. If the enabled egress QUILL fails to receive a FastKAB for a predetermined time, e.g., a few consecutive cycles as defined by the FastCheckPeriod, it generates an interrupt to the processor (e.g., the SCP 720). In response, the processor may generate a SlowKAB or it may further investigate the switch by accessing certain statistics registers.

Similar to a FastKAB, the SlowKAB is injected at an ingress QUILL and extracted at an egress QUILL. Unlike the FastKAB, however, the SlowKAB can be directed to run on a particular queuing structure in the switch. The function of the SlowKAB is identical of the FastKAB; namely, to have its existence recorded by the egress QUILL. A SlowKAB may interfere with data throughput; however, this anticipated and expected given the nature of the SlowKAB. That is, since the SlowKAB is employed for diagnostic purposes in response to an error or failure, performance is not a major concern with this KAB.

Figure 12:
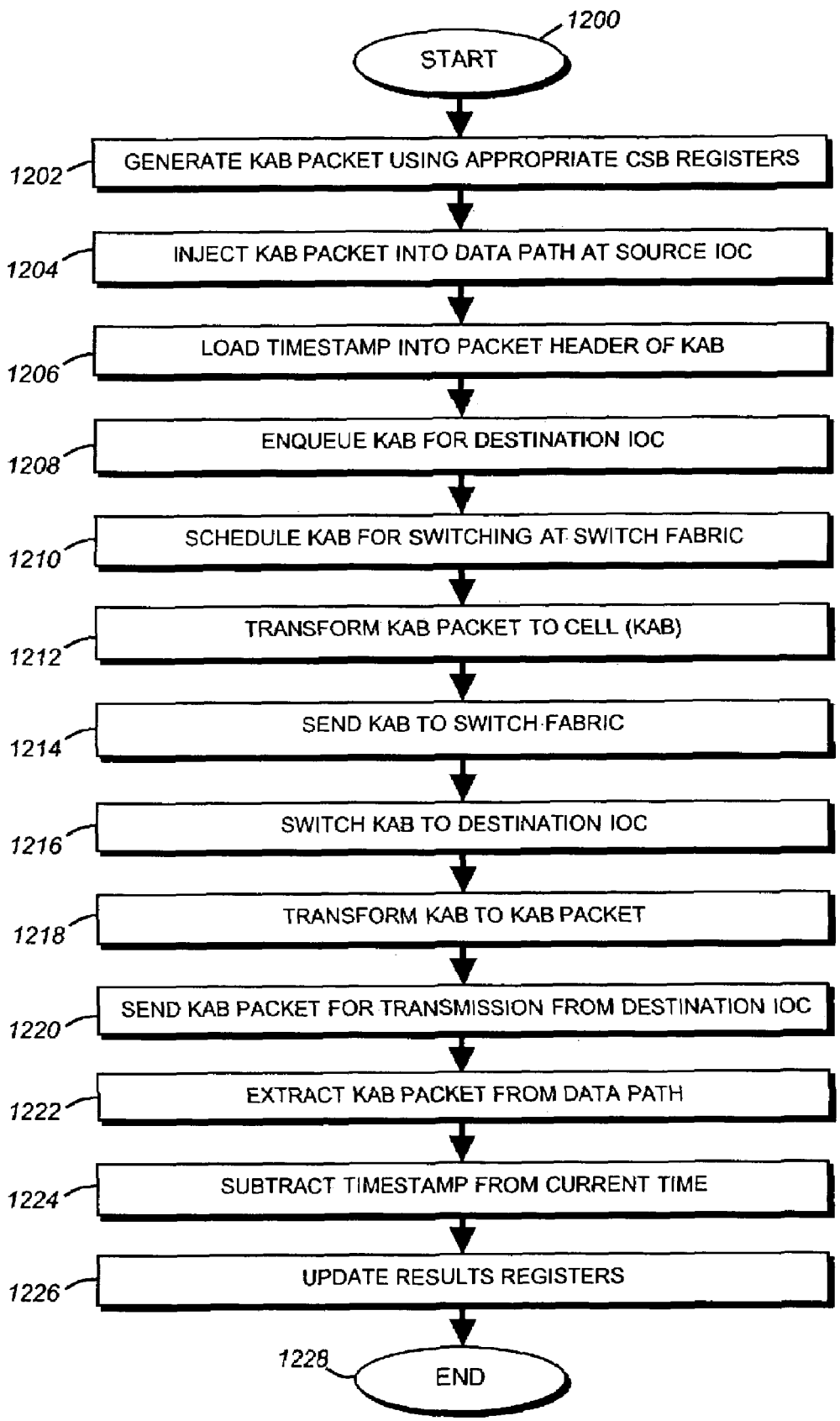
FIG. 12 is a flowchart illustrating a sequence of steps for implementing the online system monitoring technique in accordance with the present invention.

FIG. 12 is a flowchart illustrating a sequence of steps for implementing the online system monitoring technique in accordance with the present invention. The sequence starts at Step 1200 and proceeds to Step 1202 where the KAB generator 900*a* at an ingress QUILL of a source IOC generates a minimum size KAB packet 802 using parameters stored in the appropriate registers of the KAB CSB 1000. The KAB packet is injected into the data path of the switch at the ingress QUILL of the source IOC in Step 1204 and passed to the IPP 500 where a timestamp is loaded into the SLL field 854 of the packet header 850 at Step 1206. At Step 1208, the IPP enqueues the KAB packet for switching to a proper destination IOC and, at Step 1210, schedules the KAB packet for switching at the switch fabric 750; i.e., a request for switching is sent to the arbiter 765.

The IPP then transforms the KAB packet into a KAB cell (KAB) at Step 1212 and, in response to the arbiter granting the request, sends the KAB over the SERDES to the switch fabric at Step 1214. Note that although the KAB never traverses a data path within the arbiter, the arbiter 765 is "exercised" through scheduling of the KAB for switching at the switch fabric 750. In Step 1216, the SFC 700 switches the KAB through the switch fabric to the proper destination IOC and, to that end, sends the KAB over the SERDES to an egress path on the destination IOC. When the KAB is received at the egress path, the EPP 600 transforms the KAB to a KAB packet at Step 1218 and sends the KAB packet to an egress QUILL for transmission from the destination IOC of the switch (Step 1220).

At Step 1222, the KAB receiver 900b at the egress QUILL extracts (siphons-off) the KAB packet from the data path on the destination IOC. The KAB receiver then subtracts the timestamp loaded in the packet header from a current time at Step 1224. The difference between those times may be used to record the highest latency KAB to determine, e.g., whether there is (was) a bottleneck somewhere in the switch. If appropriate, the difference information is recorded in an 8-bit field (using some of the reserved bits) of the AllK-ABResults register. In an embodiment of the invention, only the maximum latency recorded from a particular source on a particular VL is stored in this field. The contents of this field are read-only for access by the processor (SCP 720).

At Step 1226, the KAB receiver 900b updates the results registers, e.g., the AllKABResults and FastKABResults registers, as appropriate, to record the source from which the KAB is sent. As noted, if any KABs are missing at the KAB receiver, the SCP 720 can read those registers to determine from which source the missing KABs were sent. The sequence ends at Step 1228.

In the illustrative embodiment, the mere existence (reception) of the KABs, i.e., whether they traversed the data path of the switch, is recorded at the egress QUILL. If KABs are not periodically received at an egress port, an indication is provided that there may be a malfunction in the switch. The malfunction indication may not be an actual error (fault), but rather could be congestion in the switch. Non-reception of KABs as a result of congestion may indicate that there is excessive traffic destined to the port that is missing the KABs. In this context, the invention provides a low-level diagnostic that monitors the internal performance of the switch.

While there has been shown and described an illustrative embodiment of an online system monitoring technique that quickly and efficiently identifies failures or other system errors arising during operation of a network switch, it is to be understood that various other adaptations and modifications may be made within the spirit and scope of the invention. For example, the KABs 800 may also cooperate with any fault tolerant elements of the switch 200 to enable failover operations that allow the switch to continue functioning in a manner that is transparent to high-level application software endpoints. To that end, the KABs may function as an assist to the fault tolerant elements to detect when there may be an actual error (fault). In addition, the KABs may be used in the initial design and debug of the switch, as well as in manufacturing test, diagnostics and performance measurement. For this purpose, the KABs can be generated at line rate (faster than the illustrative rate described herein) to exercise all relevant components of the switch. Use of the KABs obviates the need for external network equipment attached to the physical switch platform to test the internal components and functions of the switch.

The foregoing description has been directed to specific embodiments of this invention. It will be apparent, however, that other variations and modifications may be made to the described embodiments, with the attainment of some or all of their advantages. For example, it is understood that the various data structures described herein can include additional information while remaining within the scope of the present invention. While this description has been written with reference to the IBA specification, it should be noted that the principles of the invention apply to other "switched fabric" technologies. Further, it is expressly contemplated that the teachings of this invention can be implemented as software, including a computer-readable medium having program instructions executing on a computer, hardware, firmware, or a combination thereof. Accordingly, this description is to be taken only by way of example and not to otherwise limit the scope of the invention. It is the object of the appended claims to cover all such variations and modifications as come within the true spirit and scope of the invention.

What is claimed is:

1. A system adapted to quickly and efficiently identify failures or errors arising during operation of an intermediate network node, the system comprising:
   at least one source input/output module including an ingress port to receive data into the intermediate network node;
   at least one destination input/output module including an egress port to transmit the data from the intermediate network node;
   data and control paths extending through the intermediate network node between the ingress and egress ports;
   a test packet generator to generate a test packet and inject the test packet into the data path at the source input/output module, the test packet configured to exercise the data and control paths in the intermediate network node so as to detect failures or errors arising during operation of the intermediate network node;
   a control and status block (CSB) including a first register configured as a timer that determines when to generate and send the test packet and including a second register to record the source input/output module from which the test packet is sent; and
   a test packet receiver adapted to extract the test packet from the data path at the destination input/output module.

2. The system of claim 1 wherein the source input/output module comprises a source input/output card (IOC) and the destination input/output module comprises a destination IOC, the system further comprising:
   at least one switch fabric card (SFC) module having a switch fabric configured to switch the data received at the ingress port of the source IOC to the egress port of the destination IOC.

3. The system of claim 1 wherein the test packet generator comprises formatting logic coupled to registers of the CSB containing a plurality of registers that hold information relating to the generation of the test packet.

4. The system of claim 3 wherein the first register configured as a timer is one of the plurality of registers.

5. The system of claim 4 wherein the formatting logic is configured to reset the first timer, format the test packet using the information stored in the registers and inject the test packet into the data path.

6. The system of claim 3 wherein the test packet receiver comprises extraction logic coupled to the registers of the CSB.

7. The system of claim 6 wherein the extraction logic is configured to intercept the test packet from the data path, examine contents of the extracted test packet and update registers of the CSB.

8. The system of claim 1 wherein the intermediate network node comprises a network switch.

9. The system of claim 1 wherein the test packet includes a local route header, a transport header, and a cyclic redundancy check.

10. The system of claim 9 wherein the local route header includes a virtual lane (VL) field containing a number that specifies the VL over which the test packet travels.

11. The system of claim 10 wherein the test packet further comprises a packet header having an input link field that contains a value of an input (source) link port originating the test packet and a switch lifetime limit (SLL) field that contains a timestamp indicating when the test packet was created.

12. The system of claim 11 wherein the test packet further comprises a cell header having a bit that identifies the test packet and an input switch port field containing a value of an input (source) switch port originating the test packet.

13. The system of claim 12 wherein the values contained in the input switch port and input link fields are used to identify a source of the test packet.

14. The system of claim 4 wherein the test packet is manifested as a FastKAB and a SlowKAB.

15. The system of claim 14 wherein the FastKAB is generated and launched automatically by hardware such that it is regularly flowing throughout the switch to provide a periodic check of the intermediate network node.

16. The system of claim 15 wherein the first register configured as a timer is a FastKABTiming register having a registered parameter that functions as the timer, the FastKABTiming register specifying a FastCheckPeriod that indicates how often receipt of the FastKAB is checked.

17. The system of claim 16 wherein another register of the CSB is a FastKABEnable register that specifies the destination in the intermediate network node to which the FastKAB is sent and the source in the node from which to expect the FastKAB to be received.

18. The system of claim 17 wherein yet another register of the CSB is a FastKABControl register having a FastVL field that holds a value specifying a virtual lane (VL) over which the FastKAB is transmitted, a FastEnaGenerate field that enables auto generation of the FastKAB, a FastEnaIntKABs field that enables interrupt upon detection of a missing FastKAB and a FastCreditLimit field that specifies a credit limit applied to the destination.

19. The system of claim 14 wherein the SlowKAB is initiated by software to enable further diagnosis of a potential failure in the intermediate network node.

20. The system of claim 19 wherein another register of the CSB is a SlowKABControl register having a SlowInject field that triggers generation of a SlowKAB, a SlowVL field specifying a destination virtual lane (VL), a SlowDestSwfPort field specifying a destination port and a SlowDestQuill field specifying a destination link layer device.

21. The system of claim 14 wherein another register of the CSB is an AllKABResults register that provides readable state as to the number of test packets received on particular virtual lanes (VLs).

22. The system of claim 21 wherein yet another register of the CSB is a FastKABResults register that provides a summary of the AllKABResults register directed to the FastKAB.

23. The system of claim 22 wherein still yet another register of the CSB is a SlowKABControl register used to control generation and launching of the SlowKAB.

24. A method for efficiently identifying failures or errors arising during operation of a network node, the method comprising the steps of:

generating a test cell at a test cell generator of a source line card in the network node;

injecting the test cell into a data path of the network node at the source line card;

scheduling the test cell for switching at a switch fabric of the network node;

switching the test cell through the switch fabric to a destination line card specified in the test cell;

extracting the test cell from the data path at the destination line card in the network node;

recording reception of the test cell at a test cell of the destination line card;

updating results registers of a control and status block (CSB) data structure to record the source line card from which the test cell is sent; and notifying a system processor of a failure if the test cell is not received at the test cell receiver.

25. The method of claim 24 wherein the step of notifying comprises the step of automatically notifying the system processor of the failure without constant checking of status of reception of the test cell.

26. The method of claim 24 wherein the step of generating comprises the step of generating the test cell at a frequency specified by a programmable Generate Period in the CSB data structure.

27. The method of claim 26 wherein the step of recording comprises the step of checking reception of the test cell at a frequency specified by a programmable CheckPeriod in the CSB data structure.

28. The method of claim 27 wherein the programmable CheckPeriod allows the system processor to determine the frequency at which results are checked, thereby limiting a maximum response time to detecting the failure.

29. The method of claim 24 further comprising the steps of:

loading an ingress timestamp into the test cell;

generating an egress timestamp; and calculating a difference between the ingress and egress timestamps to record a highest latency test cell.

30. The method of claim 29 wherein the step of calculating comprises determining whether there is a bottleneck in the network node.

31. The method of claim 24 wherein the step of generating comprises generating the test cell using parameters stored in appropriate registers of the CSB data structure.

32. The method of claim 24 wherein the step of scheduling comprises sending a request for switching to an arbiter of the network node and, in response to the arbiter granting the request, sending the test cell to the switch fabric.

33. The method of claim 32 wherein the step of scheduling further comprises exercising the arbiter through scheduling of the test cell for switching at the switch fabric.

34. Apparatus for efficiently identifying failures or errors arising during operation of an intermediate network node, the apparatus comprising:

means for receiving data at an ingress port of the intermediate network node;

means for transmitting the data from an egress port of the intermediate network node;

means for providing data and control paths that extend through the intermediate network node between the ingress and egress ports;

means for exercising the data and control paths in the intermediate network node using a test cell to detect failures or errors arising during operation of the intermediate network node;

means for holding information related to generation of the test cell;

means for determining when to generate and send the test cell based on a timer; and means for recording an identity of a source line card from which the test cell is sent by updating results registers of a control and status block.

35. A computer readable medium containing executable program instructions for efficiently identifying failures or errors arising during operation of an intermediate network node, the executable program instructions comprising program instructions for:

receiving data at an ingress port of the intermediate network node;

transmitting the data from an egress port of the intermediate network node;

providing data and control paths that extend through the intermediate network node between the ingress and egress ports;

generating a test cell based on information contained in registers of a control and status block (CSB) and in response to a timer; and exercising the data and control paths in the intermediate network node using the test cell to detect failures or errors arising during operation of the intermediate network node; and updating results registers of the CSB to record source ports from which other test cells are sent.

* * * * *